United States Patent [19]

Takagi

[11] Patent Number: 5,134,575
[45] Date of Patent: Jul. 28, 1992

[54] METHOD OF PRODUCING NUMERICAL CONTROL DATA FOR INSPECTING ASSEMBLED PRINTED CIRCUIT BOARD

[75] Inventor: Yuuji Takagi, Yokohama, Japan

[73] Assignee: Hitachi, Ltd., Tokyo, Japan

[21] Appl. No.: 631,983

[22] Filed: Dec. 21, 1990

[30] Foreign Application Priority Data

Dec. 21, 1989 [JP] Japan .................................. 1-329471

[51] Int. Cl.⁵ .............................................. G06F 15/46
[52] U.S. Cl. ..................................... 364/552; 364/559; 364/191; 382/8; 356/394; 358/106
[58] Field of Search ................... 364/551.01, 552, 560, 364/561, 559, 488, 489, 490, 491, 151, 150, 190, 191, 579, 571.04; 382/8; 356/375, 384, 387, 394; 358/106, 107

[56] References Cited

U.S. PATENT DOCUMENTS

| 4,706,187 | 11/1987 | Arai et al. ............................ 364/491 |
| 4,794,647 | 12/1988 | Forgues et al. ..................... 358/106 |
| 4,805,110 | 2/1989 | Takahashi et al. ................... 364/491 |
| 4,876,656 | 10/1989 | Leicht et al. ......................... 364/559 |
| 4,894,790 | 1/1990 | Yotsuya et al. ...................... 364/491 |
| 4,953,100 | 8/1990 | Yotsuya ................................ 364/559 |
| 4,996,593 | 2/1991 | Hopkins .............................. 358/107 |

FOREIGN PATENT DOCUMENTS 61-107105 5/1986 Japan .

Primary Examiner—Parshotam S. Lall
Assistant Examiner—Michael Zanelli
Attorney, Agent, or Firm—Antonelli, Terry, Stout & Kraus

[57] ABSTRACT

Predetermined NC data for inspection including data of a predetermined location of an electronic component to be mounted on a PCB is stored in a microcomputer. A signal representing the image of the PCB on which no electronic component is yet mounted is obtained by using a television camera. From the obtained image signal of the PCB, the patterns of pads for mounting electronic components on the PCB is extracted. On the basis of the extracted pad patterns, the optimum location of the electronic component to be mounted is specified. The NC data of the electronic component location which is stored in the microcomputer is corrected according to the result of the specification.

2 Claims, 4 Drawing Sheets

METHOD OF PRODUCING NUMERICAL CONTROL DATA FOR INSPECTING ASSEMBLED PRINTED CIRCUIT BOARD

BACKGROUND OF THE INVENTION

The present invention relates to the inspection of assembled printed circuit boards (hereinafter "printed circuit board" is abbreviated as "PCB"), and is particularly concerned with the creation of numerical control (hereafter referred to as NC) data for use in a system for visual inspection of electronic components mounted on a PCB.

Conventionally, creation of NC data to be used in an inspection system for assembled PCBs has been carried out by on-line data teaching in the inspection system. To shorten the time needed for such teaching, automatic creation of NC data for inspection has been adopted by using NC data in a mounter which has NC data concerning electronic component locations and by using computer aided design (hereafter referred to as CAD) data created during design of the PCBs. An inspection system of this kind is exemplified in Japanese Patent Application Laid-Open No. 61-107105.

The prior art mentioned above does not handle the relation between the time needed for creating NC data for inspection and an actual PCB, so conventional teaching methods cannot permit the inspection systems to operate during teaching, resulting in the problem that a long time is required for teaching when hundreds of electronic components are mounted on a PCB. Moreover, other conventional methods of using data, such as CAD data, to automatically create NC data for inspection cannot avoid minute gaps between optimum locations and locations provided by such data, necessitating the operator's own checking if automatically created data is applied to actual data for PCBs. This difference between actual PCBs and PCB CAD data is mostly caused during manufacture of the PCBs. On the other hand, the difference between actual data for PCBs and NC data for a mounter arises partly because mounter NC data itself is produced from PCB CAD data and partly because, even if the operator corrects data on his mounter, he cannot make the final fine adjustment with his own eyes.

As for the positional allowance for mounting electronic components, no method of only using NC data on electronic component locations from external systems like data shown above can permit creating data taking into consideration the fact that such a positional allowance is not specified by some numerical value related to an electronic component location but by the forms of soldering pads at the location and by the wiring pattern around the location. Besides, in order to determine where an inspection window for checking a failure, such as solder bridging, which is likely to occur, should be positioned in an image to be inspected or an objective image, it is also necessary to consider the pad and wiring pattern of a PCB. The use of only the above-mentioned NC data on electronic component locations from external systems is not enough for creation of data including such information about PCB pad and wiring patterns. For the above reason, with the prior art, even if NC data for inspection is automatically created by such data as CAD data, it has been necessary to check the automatically created data one by one and also sometimes to add other information with the result that the data creation has taken a very long time.

SUMMARY OF THE INVENTION

It is an object of the present invention to provide a method of producing NC data for inspection, which method creates NC data for inspection of a PCB in a short time in conformity to the actual PCB and solves the above problem.

To achieve this object, in accordance with the present invention, NC data for inspection is created in advance by using data, like NC or CAD data, based on information such as locations of electronic components on a PCB. Operating an inspection system according to this NC data for inspection measures the actual PCB on which no electronic component is mounted yet. On the basis of the result of this measurement, data relating to electronic component locations in the data supplied from external systems is changed to data identifying actual locations at which to mount electronic components.

In accordance with an embodiment of the present invention, data such as data on the dimensions and locations of electronic components in NC or CAD data are used to create NC data for inspection, to measure a bare PCB on which no electronic component is mounted yet by operating an inspection system according to the created data, thus to find the locations of pads for soldering an electronic component by using the image of the bare PCB, to compare the electronic component location estimated from the locations of the pads with the electronic component location specified by the NC data for inspection and, if there is a significant difference, to correct the NC data for inspection by using the electronic component location estimated from the location of the pads. In addition, the pad locations found by using the image are used to automatically specify in the image the positional allowance for the electronic component with the pad locations as a reference and also automatically specify in the image a location, such as that of an inspection window for checking solder bridging between pads. These processes allow NC data for inspection to agree with PCBs actually produced and prevent erroneous inspection due to the gaps between NC data for inspection and actual PCBs.

DETAILED DESCRIPTION OF EMBODIMENTS

Figure 1:
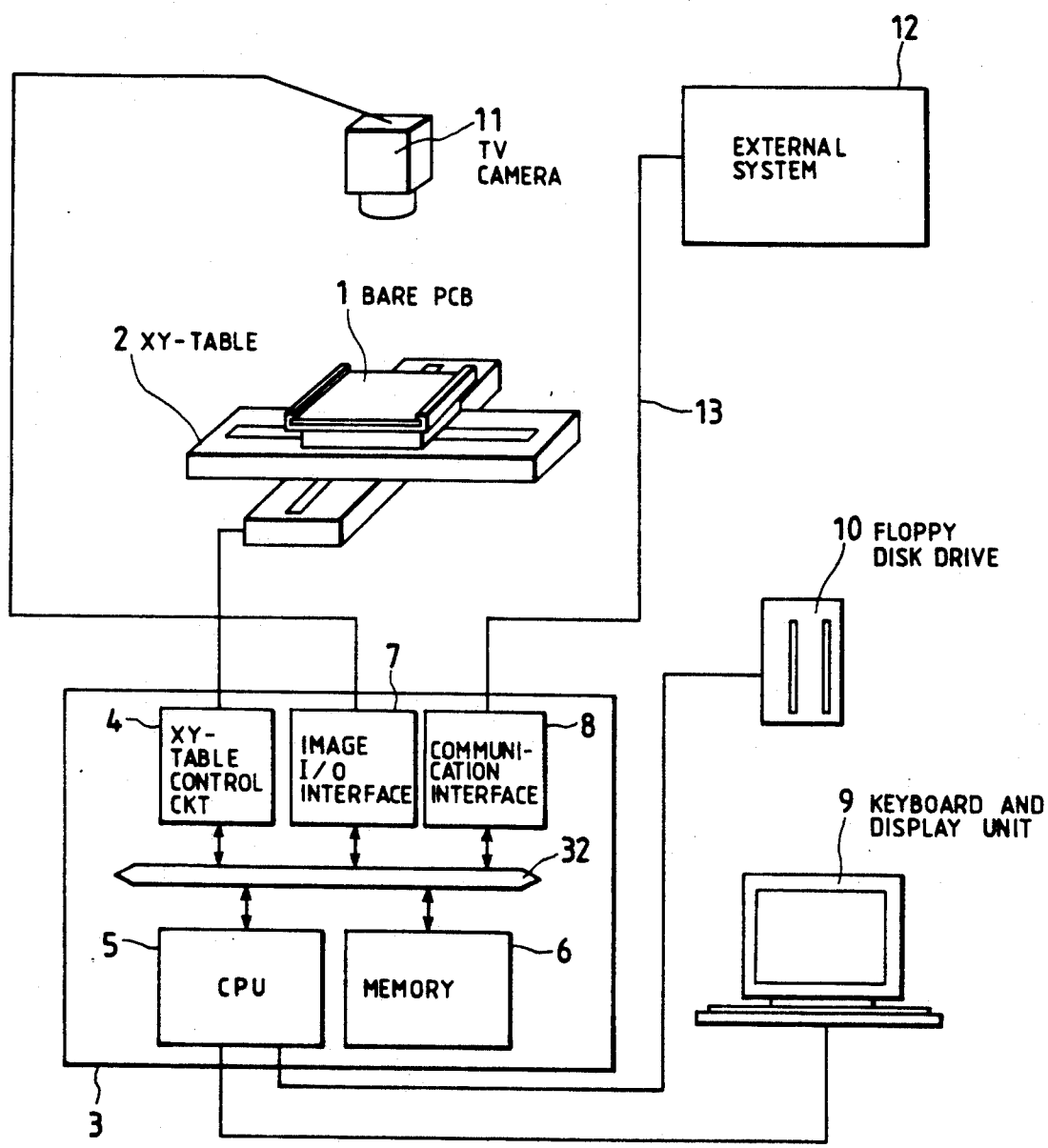
FIG. 1 is a block diagram of an example of an inspection system which carries out a method of making NC data for inspection according to the present invention.

FIG. 1 is a schematic block diagram of an example of an inspection system which carries out a method of producing NC data for inspection according to the present invention. In FIG. 1, the reference numeral 1 denotes a bare PCB. During inspection, the PCB 1 is in a state where electronic components have been mounted and soldered on it, but at the time of carrying out the method of the present invention, a PCB is used on which nothing is mounted and no adhesive or solder is placed. "Bare PCB" above refers to such a PCB. The bare PCB 1 is retained and moved by an XY table 2 to any location parallel to the X- and Y- axes. A microcomputer 3 for controlling the system is composed of an XY control circuit 4 for controlling the XY table 2, a central processing unit (hereafter referred to as a CPU) 5, a memory 6, an image input and output interface circuit 7 including an image frame memory, and a communication interface circuit 8 for communication with external systems. Data and address buses 32 provide connection among the CPU 5, XY control circuit 4, memory 6 and interface circuits 7 and 8. A keyboard and display unit 9 and a floppy disk drive 10 are provided for the microcomputer 3. A television camera 11 for obtaining the image of the PCB 1 is installed above the XY table 2 so that the camera may face the PCB 1 with the axis of its lens perpendicular to the upper surface of the PCB 1. The signals representing images obtained by the television camera 11 are sent via the image input and output interface circuit 7 to the microcomputer 3, where they are processed. A reference numeral 12 designates an external system, such as a PCB CAD system and a component mounter. A communication line 13 connects the external system 12 to the microcomputer 3 via the communication interface circuit 8.

During inspection, this inspection system, according to NC data for inspection (including data for specifying inspection procedure and data representing an inspection standard for judging whether or not to accept an object to be inspected) provided for the microcomputer 3, uses the television camera 11 to produce the images of electronic components mounted on the PCB 1, processes the images and on the basis of the result of the processing inspects the state of the electronic components mounted on the PCB.

Now a method of creating inspection NC data according to the present invention will be described.

First, data on where and what way to mount what type of electronic component on the PCB 1 is entered into the microcomputer 3 from external systems. The location of an electronic component to be mounted is represented there by the location of its central point. This data, for instance, PCB CAD system data or mounter data is entered from the external system 12 by way of the communication line 13, from the floppy disk drive 10 or manually from the keyboard and display unit 9. Data on the dimensions of each type of electronic component is produced and entered into the microcomputer 3 separately. All this data is stored in the memory 6 inside the microcomputer 3. In this way, before inspection, the microcomputer 3 stores NC data for inspection which has been specified already.

Then, also before inspection, the coordinates (offset$_x$, offset$_y$) are specified to satisfy the following equation concerning the coordinates (X, Y) for controlling the XY table 2 shown in FIG. 1 and the PCB coordinates (x, y) for NC data including data on electronic component locations on the PCB 1 entered from external systems:

$$X = x + \text{offset}_x$$

$$Y = y + \text{offset}_y. \qquad (1)$$

Besides, the resolution R (mm/picture element) of the camera 11 is specified. Namely, the coordinates (offset$_x$, offset$_y$) are obtained by substituting in the equations (1) the values (X, Y) for controlling the XY table 2 by means of the XY control circuit 4 when the reference mark for positioning on the PCB 1 is at the center of the image obtained by the camera 11 and also by substituting in the equations (1) the coordinates (x, y) for the marker on the coordinate system of the PCB. The resolution of the camera 11 is obtained by moving the reference mark for positioning in the image and then by comparing the distance the mark covers in moving in the image with the actual distance it covers. The actual distance here is obtained from the control value supplied to the XY table 2 to move the mark. Then, the relation obtained in this way between the XY table coordinates and the PCB coordinates entered from external systems is used to convert the coordinates for an electronic component location into XY table coordinates. Thus, an electronic component location specified by PCB coordinates is converted with the equations (1) into a location expressed by XY coordinates on the XY table 2, which is then used as the control value for the XY table 2 for the purpose of positioning a desired location at the center of the image obtained by the camera 11. An example of this image is shown in FIG. 2.

Figure 2:
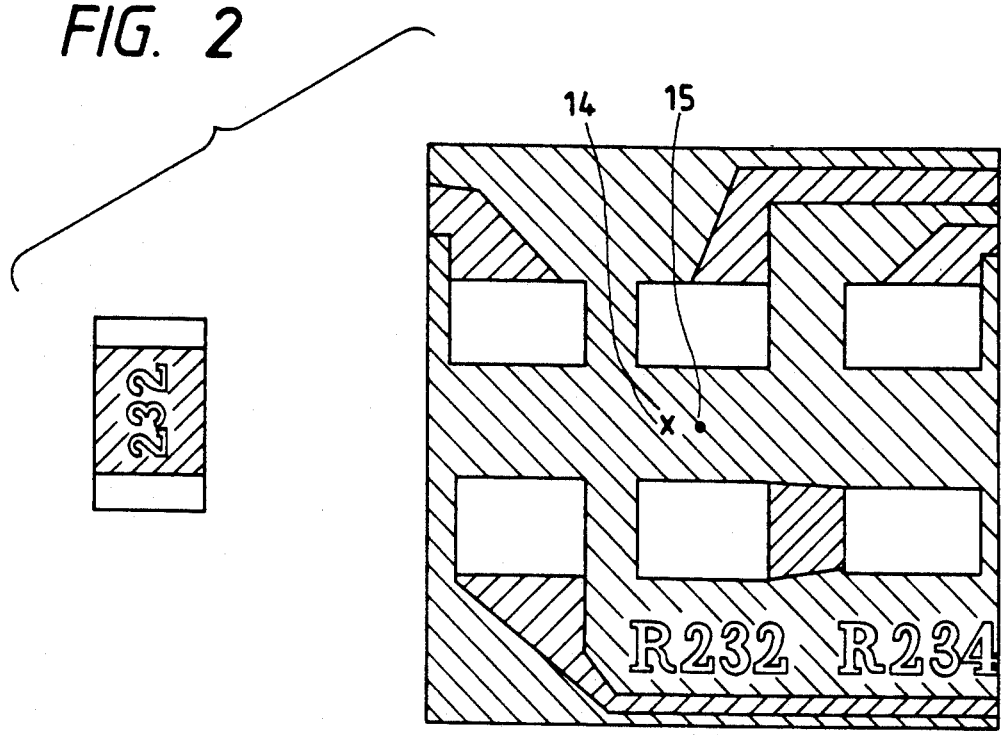
FIG. 2 is a view of an example of an image produced when the upper surface of a bare PCB is imaged by the inspection system shown in FIG. 1.

FIG. 2 is a view of an example of an image produced when the image of a bare PCB shown in FIG. 1 is entered. FIG. 2 shows the pattern of the bare PCB obtained by the television camera 11 when the XY table 2 has been shifted in the way shown above to the location where an electronic component is to be mounted. In this figure, an electronic component's location 14 specified by data from external systems is a little deviated from its optimum position 15. Then, in order to calculate the location in the image where to mount the electronic component so that the electronic component may be mounted most appropriately at its pads, the shapes of the pads are extracted by binarizing. An example of an image obtained by this binarizing is shown in FIG. 3.

Figure 3:
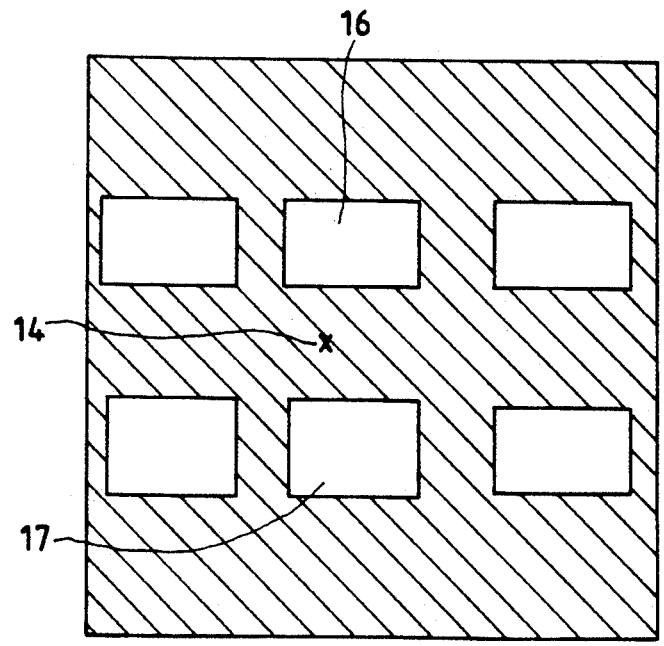
FIG. 3 shows an example of an image obtained by extracting only the shapes of pads from the image shown in FIG. 2.

FIG. 3 shows an example of an image obtained by binarizing the entered image shown in FIG. 2, that is, extracting only the shapes of the pads. FIG. 3 shows the result of a process such as binarizing applied to the entered image shown in FIG. 2 obtained by the camera in the above-mentioned manner. The threshold value for this extraction of the pads has been determined in advance by the operator or is automatically determined.

In this binarized image, each pad is extracted as an independent segment. Thus, in order to find in this image the pads for an electronic component, for example, two segments are found which have the effective area of pads and are nearest to the electronic component location 14 provided as data, and then it is checked that the line connecting the centers of the two segments is parallel with the center line of the component and that the distance of the line connecting the centers of the two segments fits the dimensions of the component.

In this way, pads 16 and 17 are found suitable for mounting the electronic component now in question as a result of the above search. In the case of an electronic component requiring more than one pad, such factors as their relative locations are adopted as a criterion for judgment about acceptance.

Now, by using the locations of the extracted pads, the optimum location of the electronic component is found in the image. This process is shown in FIG. 4.

Figure 4:
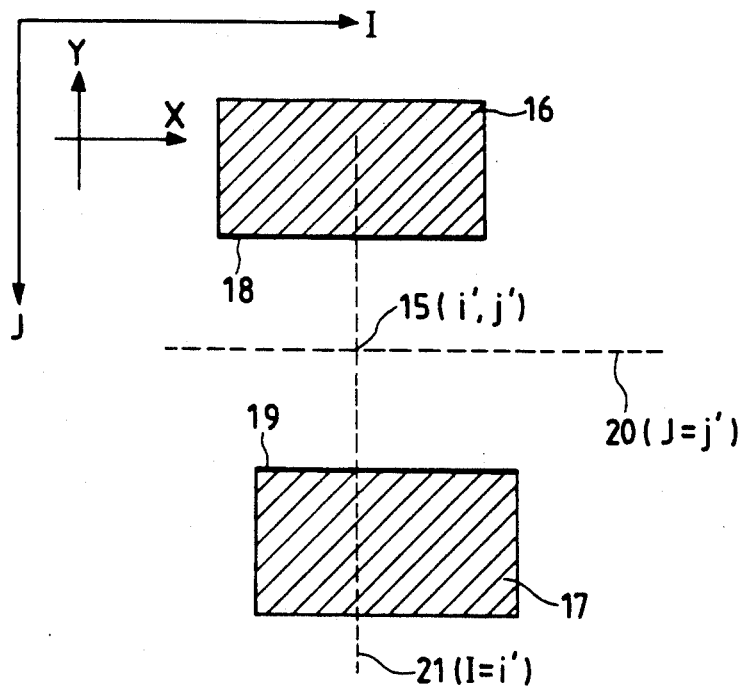
FIG. 4 is a drawing for explaining a process of determining the optimum location of an electronic component on the basis of the locations of pads shown in FIG. 3.

FIG. 4 is a drawing for explaining a process of determining the location of the electronic component by using the locations of the pads found in the process shown in reference to FIG. 3. In FIG. 4, the coordinate system in the image is assumed to be the system of image coordinates (I, J). There may be various methods of defining the optimum location of the electronic component, but one will be described herein as an example. First, the sides (edges) 18 and 19 of the segments for the pads 16 and 17 for the electronic component which face each other are found, then the straight line (center line) 20 from which these sides 18 and 19 are equally distant is found, so that a coordinate value j' for the optimum location, which is in the J coordinate, may be determined by using the equation, $J=j'$ whose graph is the line 20. As for the I coordinate, the range of the coordinate for the sides 18 and 19 is checked to find the line 21 on the center of the overlap between the two sides. Then, the equation, $I=i'$ for this center line determines a coordinate value i', which is in the I coordinate, for the optimum location. As a result, the coordinate values (i', j') for the optimum location 15 are determined on the system of image coordinates (I, J).

On the other hand, since the location (X, Y) on the system of X-Y coordinates for the XY table 2 is specified so that it may be at the origin ($i_o$, $j_o$) of the system of image coordinates (I, J) in the image, coordinate values (X', Y') on the system of X-Y coordinates for the XY table 2 corresponding to the coordinate values (i', j'), which has been calculated above with reference to FIG. 4, for the optimum location 15 of the electronic component is given by the following equations if the relation between the coordinates (X, Y) for the XY table 2 and the image coordinates (I, J) is that shown with reference to FIG. 4:

$$X' = X + R(i' - i_o)$$

$$Y' = Y + R(J_o - J') \qquad (2)$$

where the coordinate values (X', Y') are new data for positioning, that is, new data on the optimum location. In the equations (2), R denotes the resolution of the camera 11. Now, the data on the electronic component location stored in memory in the microcomputer 3 is replaced with this new data on the optimum location, and this new data on the optimum location is used as data on an electronic component location included in the NC data for inspection. This new data can also be used to reflect the correction on the original data (x, y) by substituting the new data in the equations (1).

Since pads are extracted as shown in FIG. 3, the positional allowance for mounting the electronic component is determined by using the value specified by the relative locations of these pads and the electronic component. This process will be described in reference to FIG. 5.

Figure 5:
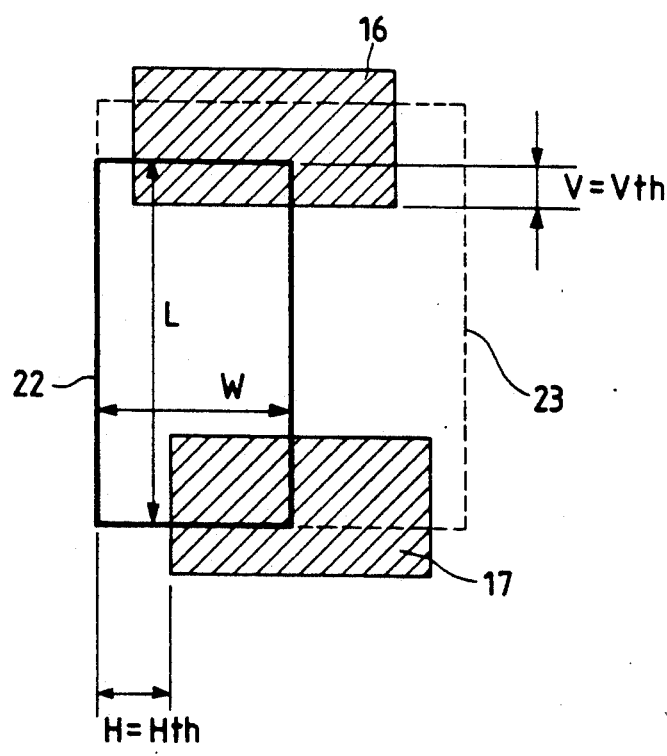
FIG. 5 is a drawing for explaining a process of determining the positional allowance for mounting an electronic component on the basis of the locations of pads shown in FIG. 3.

FIG. 5 is a drawing for explaining a process of using the pad locations found in the process described in reference to FIG. 3 in order to determine the positional allowance for mounting the electronic component. FIG. 5 shows an example of the definition of the relative locations of the pads and the electronic component, where the relative distances V and H between the pads 16 and 17 and the sides of the electronic component 22 to be mounted are used to figure out the threshold values $V_{th}$ and $H_{th}$ for these relative distances V and H respectively. Then, the range which satisfies the equations, $V = V_{th}$ and $H = H_{th}$ is defined as the positional allowance 23 for mounting the electronic component. Here, the threshold values $V_{th}$ and $H_{th}$ can automatically be specified if the values are defined in advance as proportional to the length L and the width W of the electronic component 22 to be mounted. The length L and width W of the electronic component 22 are known because the dimensions corresponding to the type of electronic component to be mounted at the location are stored as data in memory in the microcomputer 3. Thus, if the overlap between the component 22 and each of the pads 16 and 17 covers not less than one tenth of the length L of the component and at the same time if the part of the component 22 which is not overlapped covers not more than one third of the width W of the component, the positional allowance is automatically determined by applying the data on the dimensions of the type of the electronic component and the location of the pads to these equations:

$$V_{th} = L/10$$

$$H_{th} = W/3. \qquad (3)$$

The positional allowance determined in the above manner is added as data to the NC data for inspection.

Now, the process of checking defects such as solder bridging that can occur between the pads of different electronic components will be described in reference to FIG. 6.

Figure 6:
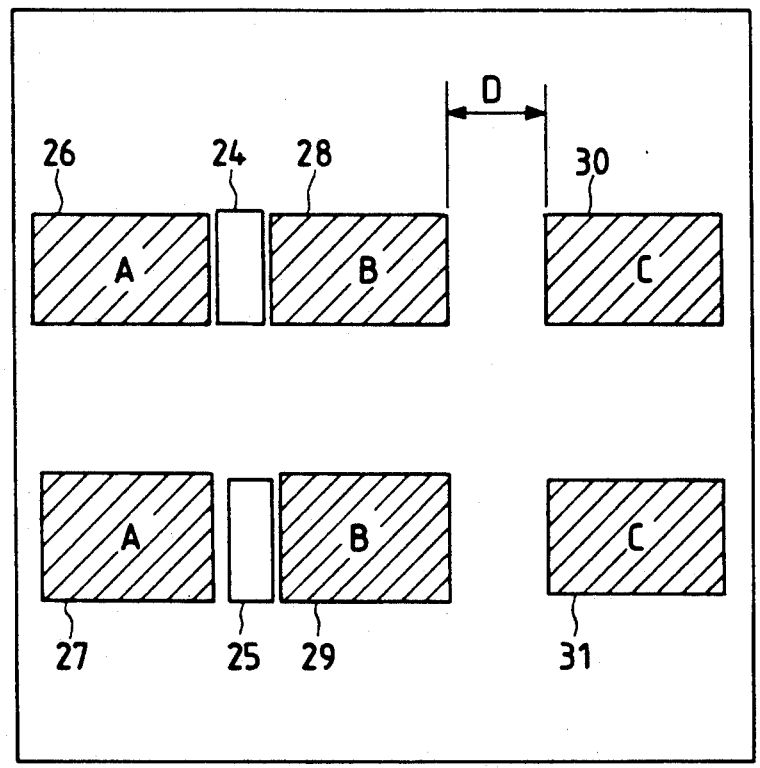
FIG. 6 is a drawing for explaining a process of providing solder bridging inspection windows between the pads at which an electronic component is to be mounted and those at which another one is to be mounted.

FIG. 6 is a drawing for explaining a process of determining the location of inspection windows, which are to be provided in the image, for checking solder bridging occurring between the pads found in the process described in reference to FIG. 3. In reference to FIG. 6, what is called solder bridging is a defect which causes a short circuit because of some solder projection forming an unwanted conductive path between the pads of different electronic components. In order to detect such solder bridging in the image, an inspection window for detecting solder bridging is provided around a location where this kind of defect is likely to occur in the image. The location of such a window is not included in data supplied from external systems, but this location can also be determined by using NC data on electronic component locations supplied from external systems and by using the locations of pads in the image of the bare PCB 1. First, if, as in FIG. 6, pads 26, 27, 28, 29, 30 and 31 are extracted, they are classified into pads A, B and C according to the electronic component to be mounted on them, and the distance D between the pads of components different from each other is measured. Since no solder bridging is thought to occur when the distance D reaches and exceeds a certain value, inspection windows 24 and 25 for checking solder bridging are provided only between the pads A and B which are spaced apart by the distance D shorter than a certain specified threshold value, as seen in FIG. 6. The locations and size of the inspection windows 24 and 25 for checking solder bridging, which are specified in the above way, are added as data to the NC data for inspection.

In accordance with the above-described embodiment, it is possible to create NC data for inspection which includes NC data on electronic component locations which reflect the PCB locations of pads, data on the positional allowance for mounting electronic components which is provided also in consideration of the PCB locations and forms of pads and data on inspection windows for checking solder bridging between pads.

The above-described method of producing NC data for inspection, if installed in the microcomputer 3 with its production procedure in the form of a program, is automatically carried out by the microcomputer 3.

According to the present invention, it is possible to compare data on electronic component locations on PCBs entered from external systems with the optimum locations of the electronic components on the PCBs and then to correct the data from external systems, leading to renewed efficient creation of data on electronic component locations in conformity to the state of actual PCBs and to reflection of the corrected location data on NC data for inspection.

In addition, since the positional allowance for mounting electronic components is automatically specified on the basis of the locations of pads on PCBs, it is possible with an electronic component to vary the positional allowance for mounting the component according to its actual location and the actual pad pattern on the PCB, resulting in the shortening of the time needed for creation of NC data for inspection in comparison with the conventional process of manually specifying such positional allowances.

Furthermore, since the location of an inspection window for checking solder bridging in the image is automatically specified on the basis of NC data on electronic component locations and the locations of pads, it is possible to shorten the time needed for creation of NC data for inspection in comparison with the conventional process of manually performing the same operation.

Still further, NC data for inspection produced in accordance with the present invention reflect the patterns of PCBs, so the use of this NC data for inspection by an inspection system allows carrying out inspection much more like elaborate manual checking performed by an inspector than conventional inspection systems which have been depending only on numerical data supplied from external systems.

What is claimed is:

1. A method of producing numerical control data for inspection in which, by using imaging means for picking up an image of a printed circuit board on which electronic components are mounted, positioning means for moving the printed circuit board into the visual field of said imaging means and holding the printed circuit board motionless in the visual field and means for controlling said positioning means so that the image information on a desired part of the printed circuit board may be obtained by said imaging means, the state of electronic components mounted on the printed circuit board is inspected on the basis of the image information delivered out of said imaging means, said method comprising the steps of:

storing in a memory in said control means predetermined numerical control data for inspection including data of predetermined locations of electronic components to be mounted on a printed circuit board;

obtaining image information on the printed circuit board on which no electronic component is mounted yet, by using said imaging means;

extracting patterns of pads for mounting electronic components on the printed circuit board from the obtained image information on the printed circuit board;

providing an inspection window for checking soldering, said window fitting between the extracted patterns of pads; and storing in said memory in said control means the location and the size of the provided window as part of numerical control data for inspection.

2. A method of producing numerical control data for inspection in which, by using imaging means for picking up an image of a printed circuit board on which electronic components are mounted, positioning means for moving the printed circuit board into the visual field of said imaging means and holding the printed circuit board motionless in the visual field and means for controlling said positioning means so that the image information on a desired part of the printed circuit board may be obtained by said imaging means, the state of electronic components mounted on the printed circuit board is inspected on the basis of the image information delivered out of said imaging means, said method comprising the steps of:

storing in a memory in said control means predetermined numerical control data for inspection including data identifying predetermined locations at which electronic component are to be mounted on a printed circuit board;

obtaining image information on the printed circuit board on which no electronic component is mounted yet, by using said imaging means;

extracting patterns of pads for mounting electronic components on the printed circuit board from the obtained image information on the printed circuit board;

classifying a plurality of pads in the extracted patterns into a plurality of groups of pads, each of said groups of pads corresponding to a respective one of said electronic components to be mounted thereon;

measuring the distance between at least one pad in a first group of pads for mounting a first electronic component and at least one pad in a second group of pads for mounting a second electronic component;

providing an inspection window for checking solder bridging between said at least one pad in said first group of pads and said at least one pad in said second group of pads, only when the measured distance between said at least one pad of said first group and said at least one pad of said second group is shorter than a predetermined value; and storing in said memory in said control means the location and the size of the provided window as part of numerical control data for inspection.

* * * * *